Patented Nov. 30, 1943

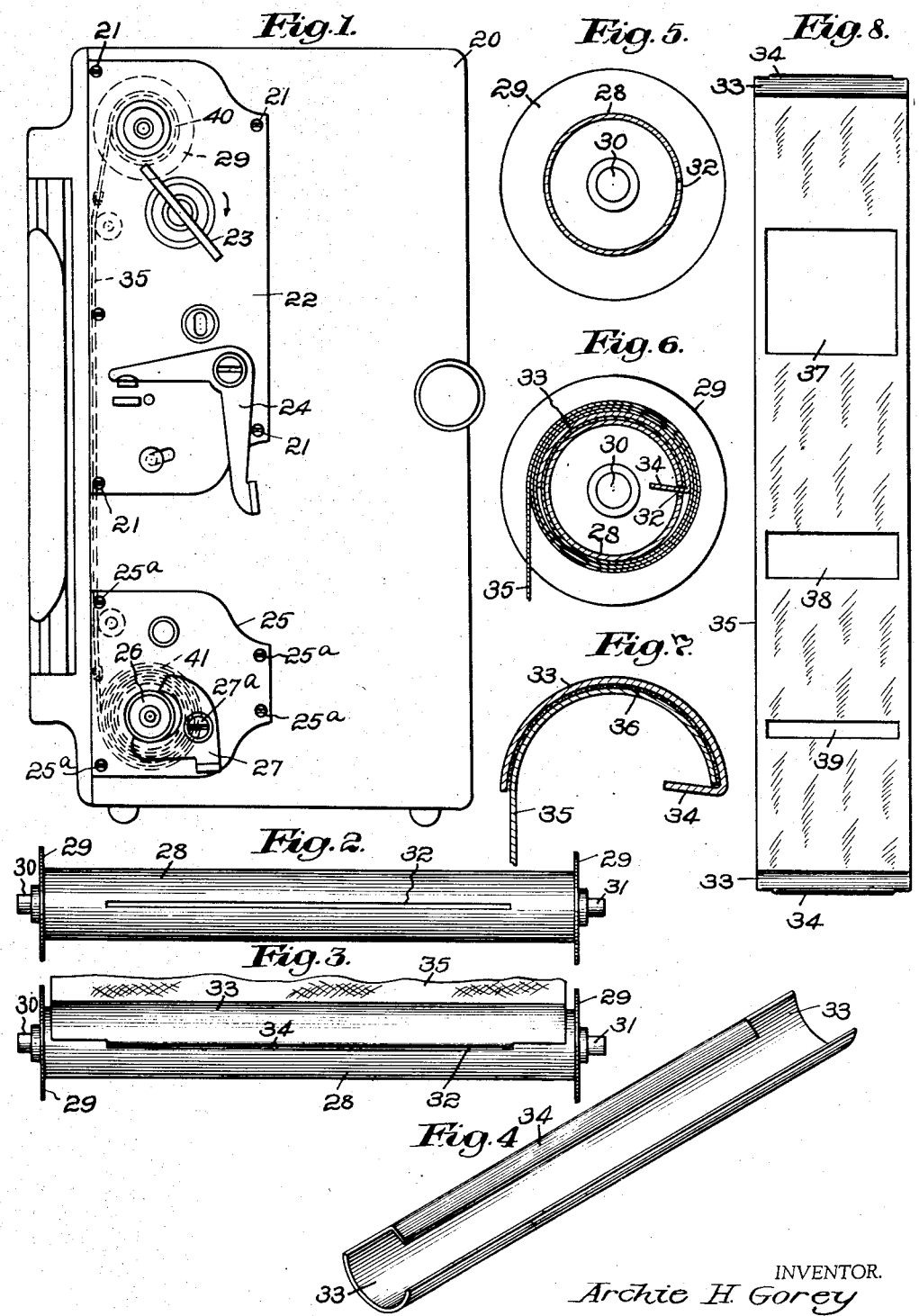

2,335,666

UNITED STATES PATENT OFFICE 2,335,666

FOCAL PLANE SHUTTER CURTAIN STRUCTURE FOR CAMERAS

Archie H. Gorey, Rochester, N. Y., assignor to The Folmer Graflex Corporation, Rochester, N. Y., a corporation of Delaware Application October 15, 1942, Serial No. 462,104

7 Claims. (Cl. 95—57)

This invention relates to a new focal plane shutter curtain structure for cameras.

In order that the principle of the invention may be readily understood, I have disclosed a single embodiment thereof in the accompanying drawing, wherein Fig. 1 is a side elevation of a Graphic camera in closed condition, showing the position of the shutter curtain and shutter curtain rollers, the latter appearing in dotted lines;

Fig. 2 is a view in elevation of one of the curtain rollers, showing the slotted aperture to receive shutter curtain attaching means;

Fig. 3 is a view similar to Fig. 2, but showing the curtain attached to the shutter curtain roller;

Fig. 4 is an isometric detail of the shutter curtain attaching means;

Fig. 5 is a vertical cross section through one of the curtain rollers more clearly to show the construction thereof;

Fig. 6 is a view similar to Fig. 5, but showing the curtain secured in place on the shutter curtain roller;

Fig. 7 is a fragmentary end view of the shutter curtain attaching means with the shutter curtain attached thereto; and Fig. 8 is a plan view of the shutter curtain having shutter curtain attaching means applied to both ends thereof.

It has been the practice for years in the construction of focal plane shutters for cameras to cement the curtain material directly to the shutter curtain rollers. There have been many attempts to find a more satisfactory solution of the problem of attaching the shutter curtain to these rollers, but so far as I know, they have all proved unsatisfactory for one reason or another. I have invented novel and satisfactory means for accomplishing this objective, and my invention can be applied to any type of shutter curtain for cameras generally, as, for instance, the multiple aperture curtain or the two-curtain variable-aperture shutter or the two-curtain variable-aperture self-capping shutter. I have chosen to disclose my invention as applied to the well-known multiple-aperture focal-plane shutter as used on Graphic and Graflex cameras, both of which are well known in the art. Obviously my invention is not restricted to shutter curtains used on said cameras, but is capable of wide application.

One of the objects of my invention is to provide shutter curtain attaching means that will assure positive and permanent connection of the curtain to the shutter curtain rollers. Other objects thereof are: to provide shutter-curtain attaching means that will permit the removal of the shutter curtain from the shutter curtain rollers without removing the rollers from the camera; to provide shutter curtain attaching means that assures a more accurate positioning of the curtain on the shutter curtain rollers; to provide shutter-curtain attaching means that permits the assembly of the shutter-curtain attaching means to the curtain in a jig or other locating means, to assure accuracy in the positioning of the several parts, thus ensuring uniform curtains; and to provide a novel shutter curtain as a new article of manufacture.

In order to set forth clearly the nature of the invention and its application to a photographic camera, I have in Fig. 1 represented a well known type of camera selected for that purpose. Obviously the shutter curtain to which my invention relates may be applied to many different types or manufactures of cameras. In explaining my invention I will first refer to parts of the camera well known in the art.

In Fig. 1, indicating a Graphic or a Graflex camera selected merely as an example of the application of my invention, the camera box or casing is indicated generally at 20 and thereto is secured by screws 21 a shutter plate 22 in which is suitably mounted the shutter-curtain rewind handle 23, and at 24 is indicated a shutter curtain release lever secured to the shutter plate 22 by screws 24a. The usual shutter curtain tension plate is indicated at 25, it being attached to the camera box or casing 20 by screws 25a, 25a. The shutter tension knob is indicated at 26 and the shutter tension release ratchet at 27, it being secured to the shutter 25 by a screw 27a. The said parts may all be of any suitable character and construction, and may be varied as desired in accordance with the particular make or character of camera to which my invention is applied.

Whereas heretofore it has been the practice to cement or otherwise adhesively secure the curtain material directly to the curtain rollers, I have, in accordance with my invention, applied to each end of the curtain material a curtain attaching member that is itself received by the corresponding roller, namely, the curtain supply or shutter rewind curtain roller at one end and the curtain tension or take-up roller at the other end. My invention therefore constitutes also a new article of manufacture, namely, a shutter curtain having secured to each end thereof respectively a member that is quickly applied in a removable and yet sure manner to the proper one of the two rollers, when the curtain is being originally installed in the camera, or when it has been repaired and is being again put in place, or when a new curtain is being substituted for the original curtain. This will be clear from the following explanation and from a consideration of Figs. 6 to 7, wherein are shown one of the rollers and its curtain attaching member. The curtain material itself having the curtain attaching members secured to the two ends thereof is shown in Fig. 8.

Referring first to Fig. 2, therein is shown a shutter curtain roller which may be the supply or rewind curtain roller, or it may be the tension or take-up roller. Therein the roller is shown as having a body 28 and end flanges 29, 29, to the left one whereof, viewing Fig. 2, is attached a pivot 30 and to the right hand one whereof is attached a shaft 31 that is broken off, as normally it is supplied with a gear meshing with the shutter rewind mechanism when the roller is used as a supply or shutter rewind curtain roller. When, however, the roller is used as a tension or take-up roller, the shaft 31 terminates outside the tension plate 25 in a knob 26 carrying a dog (not shown) for engaging a tension latch member 27. The structure thus far described is well known in the art and is representative merely.

In accordance with my invention, the body 28 of the roller is provided with an elongated slotted opening 32, the exact depth or character of which depends upon the diameter of the body 28 and whether or not the same is hollow, it being so shown in Figs. 5 and 6.

I have shown separately in Fig. 4 and as applied to an end of the curtain in Fig. 7, a preferably metallic, thin, springy, sheet metal structure desirably substantially semicircular in form, indicated at 33, and herein referred to as the curtain attaching member. It is provided with an inwardly extending keying portion 34, which may be continuous throughout its length or otherwise suitably constructed. Its purpose is to enter the slotted opening 32 of the curtain roller body 28.

The shutter curtain material itself is indicated at 35 and the extreme end area or zone thereof is attached to the inner or concaved side of the curtain attaching member 33 by suitable means, as, for example, by a suitable cement or other bonding material indicated at 36. While desirably a cement or other bonding material is employed, I may secure the end area or zone of the curtain material to the curtain attaching member by other securing means.

It will be observed, viewing Fig. 7, that the inwardly extending keying portion 34 not only provides for the attaching together of the curtain material and the roller in a manner permitting them to be readily detached when desired, but the said keying portion 34 provides an abutment or shoulder up to and against the inner face whereof the end edge of the curtain material may be exactly positioned so that the curtain is absolutely true and unbiased in its position, which might not be the case if the end area of the curtain material were merely secured by cement or otherwise to the face of the body 28 of the roller.

The curtain structure or material such as is used in Graphic and Graflex cameras, and which is shown at 35 in Fig. 8, is provided with several openings such as 37, 38, 39 of different areas. The curtain structure or material is there shown as having attached to each end area or zone thereof an attaching member 33, and in Fig. 6 I have indicated the manner in which an end of the curtain material 35 is assembled with respect to the roller body 28 through the use of the curtain attaching member 33 therefor.

The said keying portion 34 of the curtain attaching member 33 is first inserted through or into the slotted opening 32 of the roller body 28 and then the substantially semicircular portion of the curtain attaching member 33 is gotten into its final or holding position by moving it around in a contraclockwise direction viewing Fig. 6 until the curtain material 35 is smoothly in contact with the curtain roller body 28 whereon the curtain material 35 is wound on the roller body 28 by turning the flanges 29 in a clockwise direction viewing Fig. 6. After one turn of the curtain material 35 has been thus placed on the roller body 28, the curtain attaching member 33 is securely held in place by the curtain material 35, as will be evident from a consideration of Figs. 6 and 7. The curtain material 35 is then wound onto the roller body 28 until the proper amount of the said curtain material 35 has been wound up on the said roller.

The curtain material 35 is attached to both the curtain supply or shutter rewind curtain roller and to the curtain tension or take-up roller in exactly the same manner as just described excepting that the curtain supply or shutter rewind curtain roller 40, indicated in dotted lines in Fig. 1, will be turned in a clockwise direction to wind the curtain material 35 on such roller, and the tension or take-up roller, indicated in dotted lines at 41 in Fig. 1, will be turned in a contraclockwise direction when it is being applied to the opposite end area of the curtain material 35.

The means herein disclosed for attaching focal plane shutter curtains to the rollers therefore is very simple yet constitutes an extremely satisfactory solution of a problem not heretofore successfully solved so far as I am aware. While the invention is of importance with any type of camera, it is of marked importance when applied to aerial cameras that are of necessity very large, and the parts whereof must travel at high speed and wherein frequent failures occurring in the taking of photographs have been traced to the assembling of the shutter curtain.

Prior to my invention, in order to install a new shutter curtain it has been necessary to disassemble the camera and this has required the services of someone highly skilled in the photographic camera art. In the use and practice of my invention, however, it is a very simple matter to unwind the curtain and to remove the shutter attaching means from both rollers and to attach a new curtain and wind it up in the manner described on both rollers. Inasmuch as there is only one slot in the body 28 of the roller, the curtain material 35 will always be applied in exactly the right position and with great accuracy. The invention is the result of a number of years of study and research for the development of entirely satisfactory means for attaching focal plane curtains to the rollers thereof.

Having thus described one illustrative embodiment of the invention, it is to be understood that although specific terms are employed, they are used in a generic and descriptive sense and not for purposes of limitation, the scope of the invention being set forth in the following claims.

I claim:

1. A curtain attaching member for a flexible-strip focal plane shutter, consisting of a thin, springy, sheet-metal piece concaved to fit upon the body portion of a curtain roller and having an end of said flexible strip secured to the inner, concaved face of said curtain attaching member, said member having at its end a keying portion adapted for readily-detachable holding engagement with the said curtain roller and constituting also a truing abutment or shoulder for said end of said flexible strip.

2. A curtain attaching member for a flexible-strip focal plane shutter consisting of a thin, springy, sheet-metal piece concaved to fit upon the body portion of a curtain roller and having an end of said flexible strip secured to the inner, concaved face of said curtain attaching member, said member having its extreme end bent at an angle to such concaved portion to constitute a keying portion for insertion in a lengthwise extending slot in the body of the said curtain roller and constituting also a truing abutment or shoulder for said end of said flexible strip.

3. A focal plane curtain structure consisting of a flexible curtain strip, a supply or shutter rewind curtain roller and a tension or take-up roller, each having its body portion lengthwise slotted, and two curtain attaching members respectively cemented to the opposite ends of said strip, each said curtain attaching member consisting of a thin, springy, sheet-metal piece concaved to fit upon the body portion of the respective one of said rollers, each said attaching member having its extreme end bent at an angle to such concaved portion and inserted in the slot in the body portion of such roller, each extreme end edge of the curtain flexible strip being positioned by such cementing against the inner face of such bent end that constitutes the keying portion, and which bent end therefore acts as a truing abutment or shoulder for the said flexible strip.

4. A camera, focal-plane shutter-curtain attaching member for application to the body portion of a camera curtain roller provided with a lengthwise extending slot, in combination with the focal-plane shutter curtain of the camera, said attaching member consisting of a thin, springy, sheet metal piece concaved to fit upon the body portion of such curtain roller, and having a keying portion to be received in such slot of the curtain roller, the end portion of said shutter curtain being secured to the inner concaved face of said attaching member with the extreme end of said shutter curtain positioned against the inner face of said keying portion which thus provides an abutment facilitating the exact positioning of the curtain end, when securing said shutter curtain to said attaching member.

5. A structure in accordance with claim 4, but wherein said shutter curtain is cemented to said inner concaved face of said attaching means.

6. A structure in accordance with claim 4, but wherein said keying portion is provided at the extreme end of said attaching member.

7. A focal-plane curtain structure consisting of a flexible curtain strip, a supply or shutter rewind curtain roller and a tension or take-up roller, each having its body portion lengthwise slotted, and two curtain attaching members respectively secured to the opposite ends of said strip, each said curtain attaching member consisting of a thin, springy, sheet-metal piece concaved to fit upon the body portion of the respective one of said rollers, each said attaching member having its extreme end bent at an angle to such concaved portion and inserted in the slot in the body portion of such roller, each extreme end edge of the curtain flexible strip being positioned by the securing means against the inner face of such bent end that constitutes the keying portion, and which bent end therefore acts as a truing abutment or shoulder for the said flexible strip.

ARCHIE H. GOREY.